(12) United States Patent
Maman et al.

(10) Patent No.: US 9,043,895 B2
(45) Date of Patent: May 26, 2015

(54) REVERSE PROXY DATABASE SYSTEM AND METHOD

(75) Inventors: David Maman, Tel Aviv-Yafo (IL); Yuli Stremovsky, Petah Tiqwa (IL)

(73) Assignee: GREEN SQL LTD., Tel Aviv (IL)

( * ) Notice: Subject to any disclaimer, the term of this patent is extended or adjusted under 35 U.S.C. 154(b) by 0 days.

(21) Appl. No.: 13/813,662

(22) PCT Filed: Aug. 1, 2011

(86) PCT No.: PCT/IB2011/053416
§ 371 (c)(1),
(2), (4) Date: Feb. 3, 2013

(87) PCT Pub. No.: WO2012/017377
PCT Pub. Date: Feb. 9, 2012

(65) Prior Publication Data
US 2013/0133059 A1 May 23, 2013

Related U.S. Application Data

(60) Provisional application No. 61/369,759, filed on Aug. 2, 2010.

(51) Int. Cl.
*H04L 29/06* (2006.01)
*G06F 17/30* (2006.01)
*H04L 29/08* (2006.01)

(52) U.S. Cl.
CPC ...... *H04L 63/0281* (2013.01); *G06F 17/30566* (2013.01); *H04L 63/0823* (2013.01); *H04L 63/0884* (2013.01); *H04L 63/102* (2013.01); *G06F 17/30289* (2013.01); *G06F 17/30477* (2013.01); *H04L 67/2895* (2013.01); *H04L 69/08* (2013.01)

(58) Field of Classification Search
CPC ......... H04L 67/00; H04L 63/00; H04L 61/00; H04L 63/0884; H04L 29/08702; H04L 29/12405; H04L 63/0281; H04L 63/0823; H04L 63/102
See application file for complete search history.

(56) References Cited

U.S. PATENT DOCUMENTS

| | | | |
|---|---|---|---|
| 6,675,261 B2 * | 1/2004 | Shandony | 711/121 |
| 7,274,783 B2 | 9/2007 | Yoakum et al. | |
| 7,444,408 B2 | 10/2008 | Rajavelu et al. | |
| 7,716,206 B2 | 5/2010 | Aaron | |
| 2002/0004796 A1 | 1/2002 | Vange et al. | |
| 2005/0086347 A1 | 4/2005 | Deen et al. | |
| 2005/0154886 A1 * | 7/2005 | Birk et al. | 713/168 |
| 2007/0150602 A1 * | 6/2007 | Yared et al. | 709/227 |
| 2009/0083726 A1 * | 3/2009 | Amend et al. | 717/171 |

FOREIGN PATENT DOCUMENTS

WO 03009174 A1 1/2003

* cited by examiner

*Primary Examiner* — Chau Le
*Assistant Examiner* — Muhammad Chaudhry
(74) *Attorney, Agent, or Firm* — Graeser Associates International Inc; Dvorah Graeser

(57) ABSTRACT

A system and method for providing a comprehensive security solution for databases through a reverse proxy, optionally featuring translating database queries across a plurality of different database platforms.

21 Claims, 13 Drawing Sheets

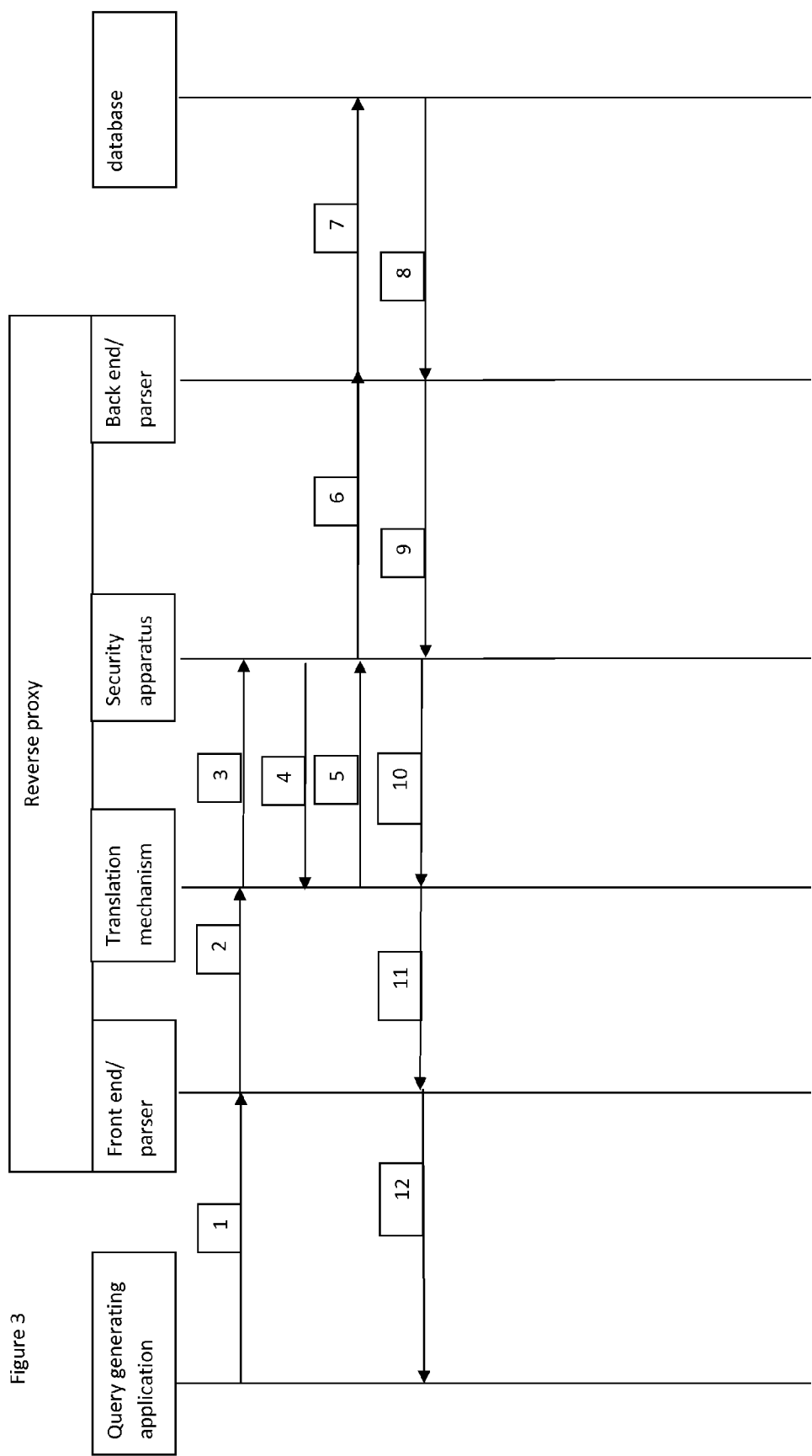

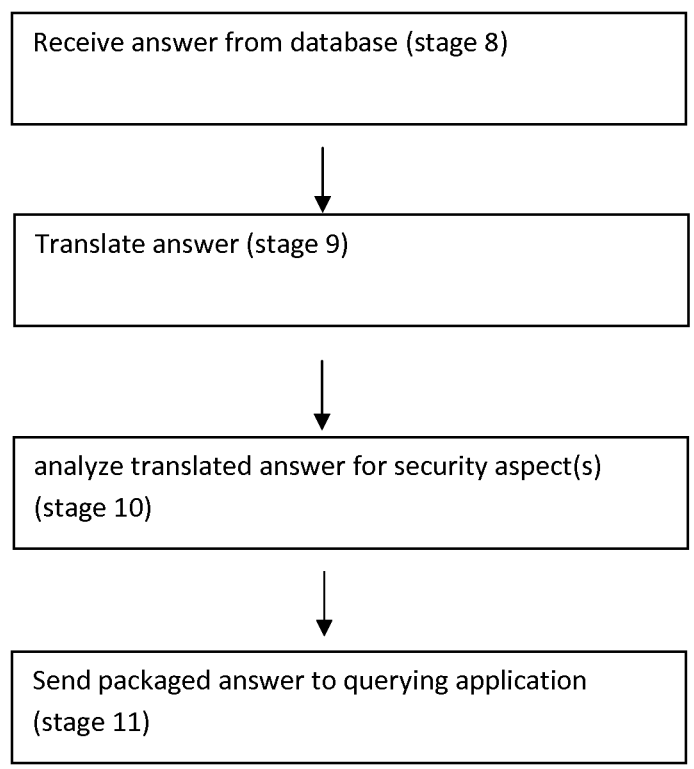
Figure 4 (con't)

REVERSE PROXY DATABASE SYSTEM AND METHOD

FIELD OF THE INVENTION

The present invention is of a system and method for a database proxy and in particular, such a system and method for providing a reverse database proxy.

BACKGROUND OF THE INVENTION

Relational databases, and their corresponding management systems, are very popular for storage and access of data. Relational databases are organized into tables which consist of rows and columns of data. The rows are formally called tuples. A database will typically have many tables and each table will typically have multiple tuples and multiple columns. The tables are typically stored on direct access storage devices (DASD) such as magnetic or optical disk drives for semi-permanent storage.

Typically, such databases are accessible through queries in SQL, Structured Query Language, which is a standard language for interactions with such relational databases. An SQL query is received by the management software for the relational database and is then used to look up information in the database tables.

Database proxies are often used to manage database access. For example, U.S. Pat. No. 7,716,206 to Aaron describes a system which features a proxy in order to maintain user privacy when searching a database. In some cases, the database proxy is transparent, such that the end user is not aware of its existence, nor does the end user need to take any special action when interacting with the database through such a proxy. U.S. Pat. No. 7,274,783 to Yoakum et al describes such a transparent proxy implementation.

Other problems with such systems include the inability to provide sufficient security for their respective databases. Data in such databases needs to be well protected, yet at the same time, needs to be widely available to various front end applications and queries, including through such non-secure computer networks as the Internet.

One example of a security method relates to a database firewall, in which the firewall prevents unauthorized access to the database (or indeed to other computers within a protected network). U.S. Pat. No. 7,444,408 to Rajavelu, et al. describes a method for automatically configuring a firewall for a secure "enclave" within a larger network.

SUMMARY OF THE INVENTION

The background art does not teach or suggest a transparent reverse proxy which is able to provide security for a database. The background art does not teach or suggest a transparent reverse proxy which is also able to handle translations between different database platforms.

The present invention overcomes the deficiencies of the background art by providing a system and method, in at least some embodiments, for a reverse database proxy which optionally also features integrated security.

According to some embodiments of the present invention, there is provided a method for providing security in a system having a plurality of databases and a plurality of accessing applications, the method comprising:

Providing a reverse proxy for handling requests between the accessing applications and the databases;

sending a request from the accessing application to the reverse proxy;

analyzing the request by the reverse proxy to determine to which database the request is directed to and whether the request is acceptable according to at least one policy and to determine an address of a database for receiving the request; and if the request is acceptable, passing the request to the address of the database by the reverse proxy.

Optionally, according to the policy, the request might be encrypted before sending it to the database, using a certificate stored on the reverse proxy, and/or by using common encryption algorithms (for example with a shared key). Such encryption results in storing encrypted data in the database is encrypted, such that the data cannot be read without a request delivered to the database using the reverse proxy solution holding the decryption key.

Optionally, the method further comprises receiving a response by the reverse proxy from the database;

Analyzing the response by the reverse proxy to determine whether the response is acceptable according to at least one policy; and If the response is acceptable, then transferring the response to the accessing application by the reverse proxy.

Preferably, the analyzing the response by the reverse proxy comprises determining whether sensitive information is included in the response; and if so, removing the sensitive information before the response is transferred to the accessing application.

Optionally, according to the policy, part of the response from the database can be masked so that sensitive information is not revealed to the accessing application requesting this information. One non-limiting example of such masking is to allow only the last four digits of a credit card number (which are generally made public) to be returned while masking all other digits by substituting any character.

More preferably, the sending the request from the accessing application to the reverse proxy comprises transmitting the request through a secure channel.

Most preferably the secure channel comprises a certificate, and wherein the reverse proxy issues the certificate to the accessing application, such that communication between the reverse proxy and the accessing application is secured by a first certificate and such that communication between the reverse proxy and the database is secured by a second certificate.

Alternatively, the secure channel optionally comprises a certificate, the method further comprising issuing the certificate for communication between the accessing application and the database; and transmitting the certificate from the accessing application to the database through the reverse proxy.

According to at least some embodiments of the present invention, the analyzing the request by the reverse proxy to determine whether the request is acceptable further comprises determining whether the request requires translation and if so, translating the request before transmission to the database.

Optionally, the analyzing the response by the reverse proxy comprises determining whether the response requires translation and if so, translating the response before transmitting to the requesting application.

Unless otherwise defined, all technical and scientific terms used herein have the same meaning as commonly understood by one of ordinary skill in the art to which this invention belongs. The materials, methods, and examples provided herein are illustrative only and not intended to be limiting.

Implementation of the method and system of the present invention involves performing or completing certain selected tasks or steps manually, automatically, or a combination thereof. Moreover, according to actual instrumentation and equipment of preferred embodiments of the method and system of the present invention, several selected steps could be implemented by hardware or by software on any operating system of any firmware or a combination thereof. For example, as hardware, selected steps of the invention could be implemented as a chip or a circuit. As software, selected steps of the invention could be implemented as a plurality of software instructions being executed by a computer using any suitable operating system. In any case, selected steps of the method and system of the invention could be described as being performed by a data processor, such as a computing platform for executing a plurality of instructions.

Although the present invention is described with regard to a "computer" on a "computer network", it should be noted that optionally any device featuring a data processor and the ability to execute one or more instructions may be described as a computer, including but not limited to any type of personal computer (PC), a server, a cellular telephone, an IP telephone, a smart phone, a PDA (personal digital assistant), or a pager. Any two or more of such devices in communication with each other may optionally comprise a "computer network".

BRIEF DESCRIPTION OF THE DRAWINGS

The invention is herein described, by way of example only, with reference to the accompanying drawings. With specific reference now to the drawings in detail, it is stressed that the particulars shown are by way of example and for purposes of illustrative discussion of the preferred embodiments of the present invention only, and are presented in order to provide what is believed to be the most useful and readily understood description of the principles and conceptual aspects of the invention. In this regard, no attempt is made to show structural details of the invention in more detail than is necessary for a fundamental understanding of the invention, the description taken with the drawings making apparent to those skilled in the art how the several forms of the invention may be embodied in practice.

In the drawings:

FIG. 3 is a flow diagram of an exemplary, illustrative method for operation of a reverse proxy according to at least some embodiments of the present invention;

DESCRIPTION OF THE PREFERRED EMBODIMENTS

The present invention provides a system and method, in at least some embodiments, for a reverse database proxy which optionally also features integrated security.

Figure 1A:
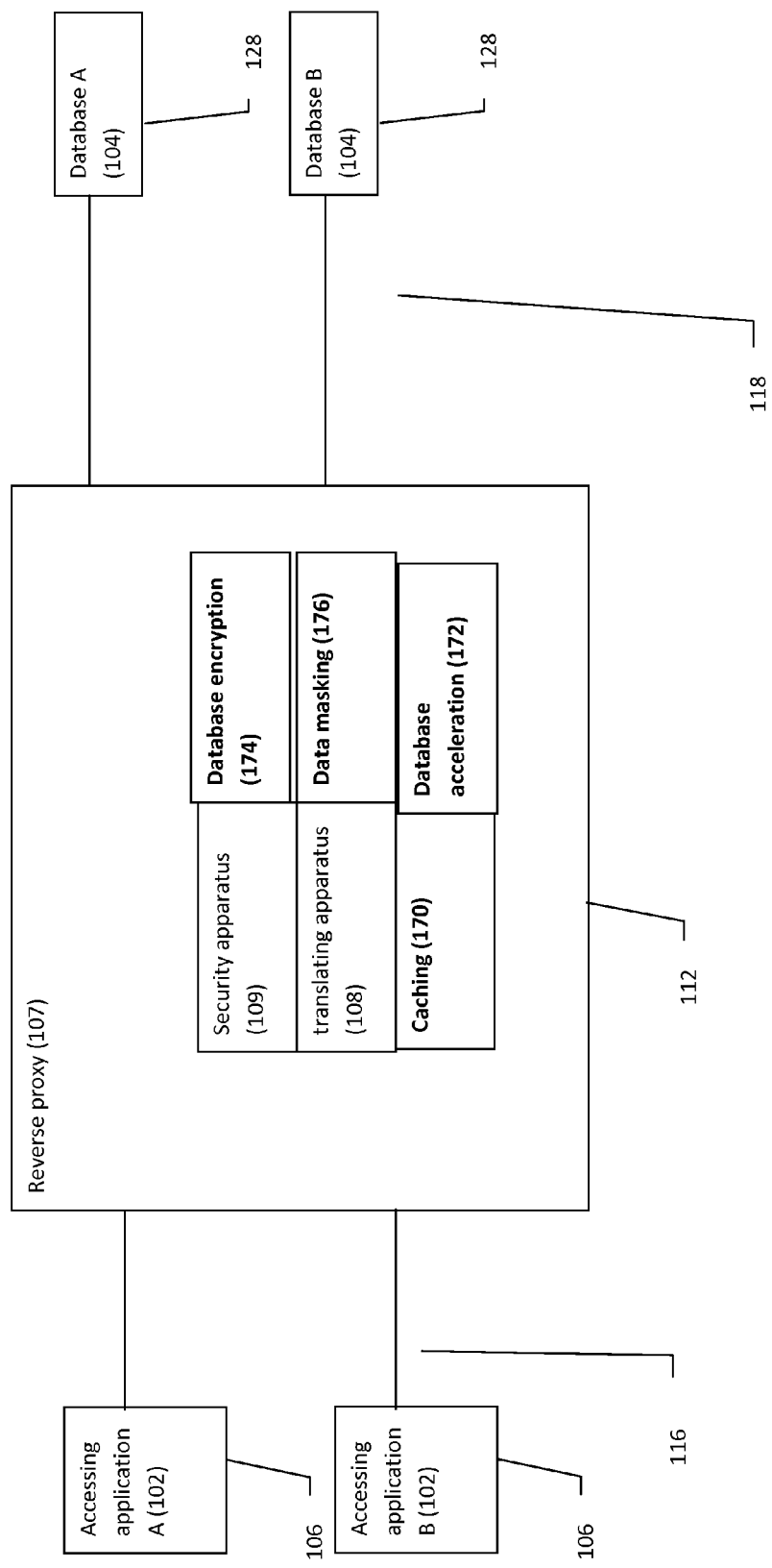
FIGS. 1A-1C show exemplary, illustrative non-limiting systems for a reverse proxy, including a basic system (FIG. 1A) and more detailed systems (FIGS. 1B and 1C), in which the reverse proxy is separate from the database, according to some embodiments of the present invention.
Figure 1B:
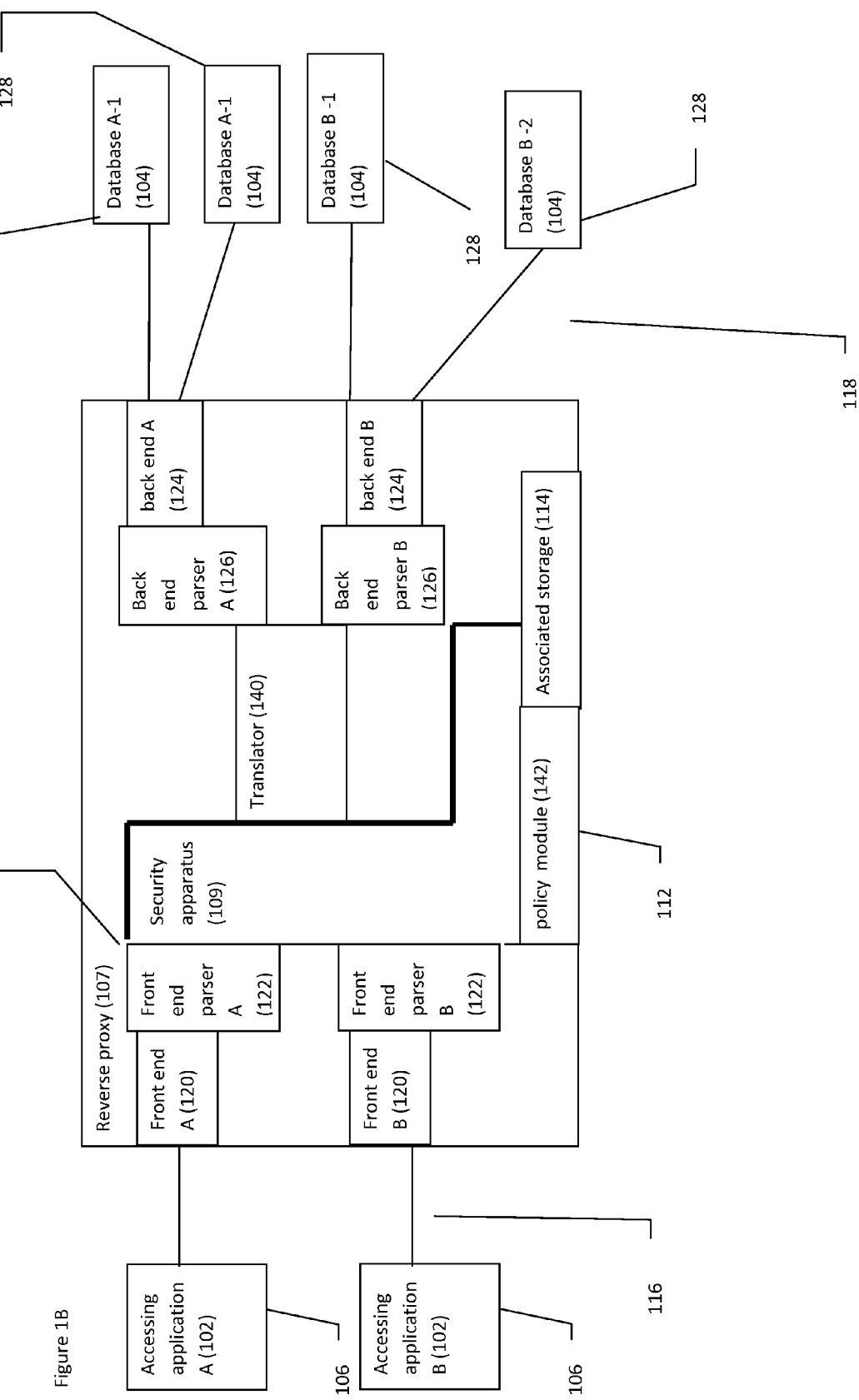
Figure 1C:
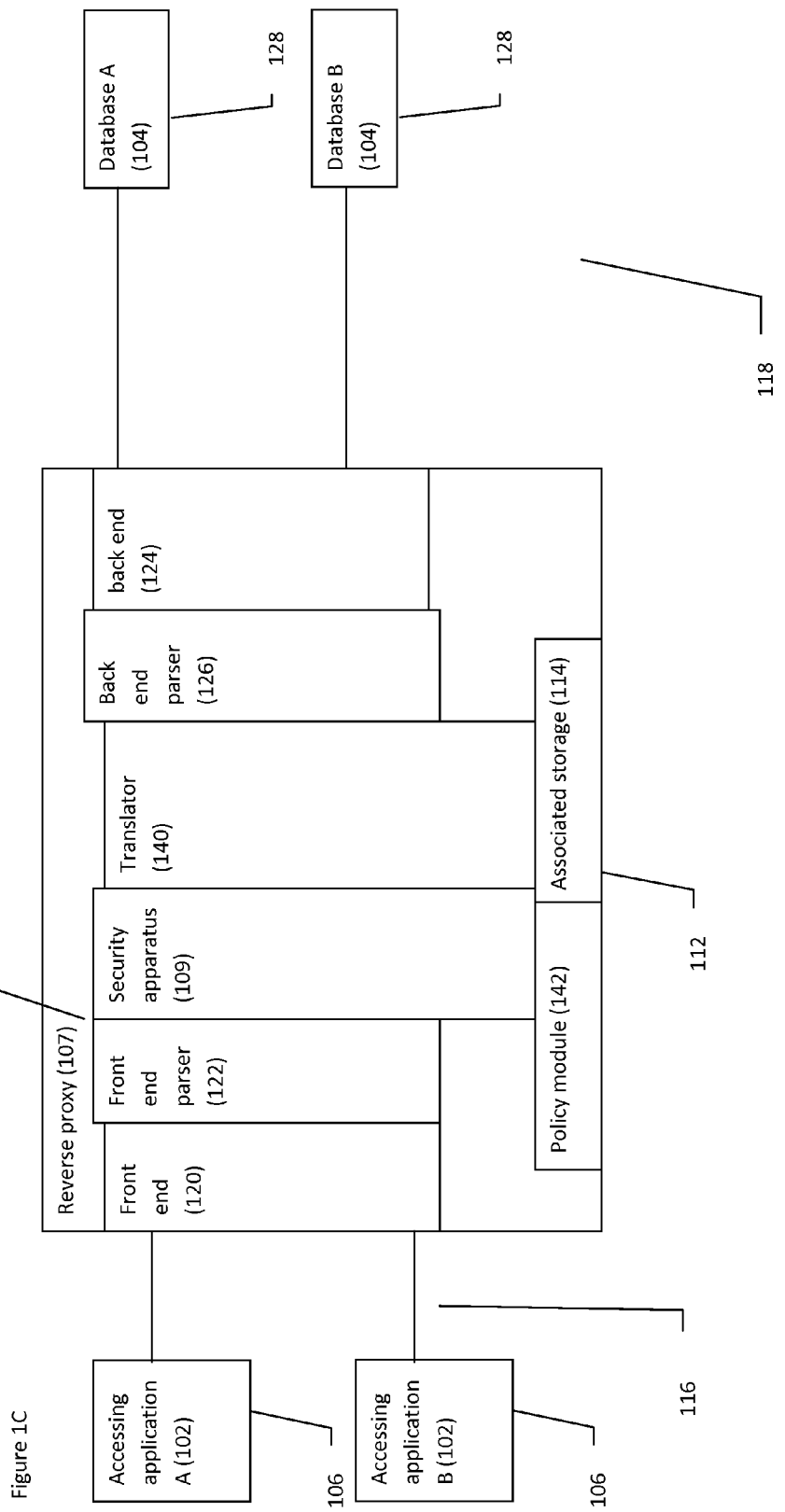

Referring now to the drawings, FIGS. 1A-1C show exemplary, illustrative non-limiting systems for a reverse proxy that is separate from the database, according to some embodiments of the present invention. As shown in FIG. 1A, a system 100 features a plurality of accessing applications 102 for providing a software application interface to access one or more of a plurality of databases 104. Two accessing applications 102, A and B, are shown; as are two databases 104, A and B, for the purpose of illustration only and without any intention of being limiting.

Accessing application 102 may optionally be any type of software, or many optionally form a part of any type of software, for example and without limitation, a user interface, a back-up system, web applications, data accessing solutions and data warehouse solutions. Accessing application 102 is a software application (or applications) that is operated by some type of computational hardware, shown as a computer 106. However, optionally computer 106 is in fact a plurality of separate computational devices or computers, any type of distributed computing platform and the like; nonetheless, a single computer is shown for the sake of clarity only and without any intention of being limiting.

Similarly, database 104 is a database software application (or applications) that is operated by some type of computational hardware, shown as a computer 128. Again, optionally computer 128 is in fact a plurality of separate computational devices or computers, any type of distributed computing platform and the like; nonetheless, a single computer is shown for the sake of clarity only and without any intention of being limiting.

In a typical prior art system, accessing application 102 would communicate directly with database 104, and would therefore need to be able communicate in the query language and according to the query protocol for database 104. However, in this illustrative embodiment of the present invention, accessing application 102 communicates with database 104 through a translating apparatus 108, shown as part of a reverse proxy 107. As described in greater detail below, translating apparatus 108 preferably receives database queries from accessing application 102, which would otherwise have been sent directly to database 104. Translating apparatus 108 therefore preferably acts as a forwarding solution for database 104.

Translating apparatus 108 is shown as being operated by a computer 112, but in fact could optionally be implemented as software (by computer 112 for example), hardware, firmware or a combination thereof. Again, if present, optionally computer 112 is in fact a plurality of separate computational devices or computers, any type of distributed computing platform and the like; nonetheless, a single computer is shown for the sake of clarity only and without any intention of being limiting.

In order to provide security for databases 104, reverse proxy 107 also features a security apparatus 109. Security apparatus 109, as shown in greater detail below, preferably screens all received queries and data from portions of system 100 that are external to databases 104, including for example accessing applications 102 A and B. Although security apparatus 109 and translating apparatus 108 are shown as separate components, in fact preferably both security apparatus 109 and translating apparatus 108 interact through a plurality of different modules and interactions for providing both security and translation functionalities for system 100, as shown in greater detail below.

Reverse proxy 107 also optionally comprises a caching module 170, for at least temporarily storing requests and responses for example, or any other data or information which could improve the performance of system 100. Caching 170 may optionally be used alone or in combination with a database acceleration module 172 for further improving the performance of system 100.

Also optionally one or more databases 104 may be encrypted, such that queries to and responses from such an encrypted database 104 are also encrypted, through a database encryption module 174. Data itself may also optionally be masked through a data masking module 176 as described in greater detail below.

FIG. 1B shows translating apparatus 108 in greater detail, preferably comprises a plurality of front ends 120, of which two are shown (A and B) for the purpose of description only and without wishing to be limiting in any way, for receiving queries from the respective accessing application 102 A or B. Each front end 120, A or B, is preferably accessed through a particular port or address, which may optionally be an IP address for example, such that accessing application 102 (A or B) sends database queries to the particular port or address through which the particular front end 120, A or B, is accessible. For the embodiment shown, front end 120 preferably does not need to analyze the received query in order to determine the database software and/or protocol and/or language that is suitable for the query.

Each front end 120 preferably comprises a front end parser 122, shown as A or B, for parsing queries received from accessing application 102 into a general format and for returning the results of a query in the proper language, protocol, format etc to accessing application 102. Optionally front end parser 122 operates only to prepare the results of the query and does not operate on the query itself. It should be noted that optionally and preferably, accessing application 102 does not need to be adjusted in any way, apart from transmitting queries to a particular port or address; instead, accessing application 102 is preferably implemented as for any other prior art system. Thus, accessing application 102 could optionally be a legacy application, for example, which does not necessarily need to be adjusted for interoperation with system 100.

The query is preferably passed to security apparatus 109, which checks the query for conformation to one or more policies (for example optionally stored in a policy module 142, as described in greater detail below), before passing the query to a translator 140. According to the information provided with the query, translator 140 determines to which database 104 (in this example, A or B), the query is to be directed and then translates the query to the specific language of the particular database 104 A or B, according to the specific software implementation of database 104 A or B (for example, a particular implementation of SQL). The translated query is then sent to an appropriate back end parser 126, which is operated by an appropriate back end 124, as determined according to information received by translator 140 with the query. Back end parser 126 prepares the translated query according to any requirements of the receiving database 104. Back-end 124 then preferably sends the translated query to database 104. For example, back end parser 126 A receives translated queries intended for database 104 A, prepares the queries accordingly, and transfers the queries to back end 124 A, which then sends the prepared queries to database 104 A.

Database 104 then preferably sends the results of the query to the appropriate back-end 124, at which point the process is preferably repeated in reverse, as described in greater detail below.

Also as described in greater below, in some cases, translator 140 is unable to translate all or part of the query, in which case the query (in whole or in part) is passed to the appropriate back end parser 126 without translation. Back end parser 126 may still need to prepare at least some aspects of the query for transfer to the appropriate database 104.

Optionally, the translated query and/or any portions thereof (for example during the translation process) is stored, at least temporarily, in an associated storage 114, which could optionally be implemented as some type of memory (and/or optionally as a portion of memory of computer 112, for example if shared with one or more other applications, in which an area is dedicated to storage of such queries). Also, in cases where at least a portion of the query cannot be translated (for example, as described in greater detail below with regard to raw data or binary data), optionally a message indicating the nature of the non-translated portion and how to read or otherwise access it is stored in associated storage 114; preferably, however, such a message is stored in database 104 itself. Other types of data and information, including but not limited to any type of policy, stored parameters etc may optionally be stored in associated storage 114 but are preferably stored in database 104.

Also optionally and preferably, the determination of the appropriate database 104 (and hence the appropriate back end parser 126 and back end 124) is determined according to a policy stored in policy module 142. For example, translator 140 may optionally be able to look up the appropriate identity of the back end 124 through policy module 142. Such flexibility also enables the exact type and/or port or address of databases 104 to be determined according to information stored in policy module 142. Also, optionally back end 124 is able to locate the appropriate port or address through policy module 142, for transmitting the translated query.

Optionally, according to at least some embodiments of the present invention, reverse proxy 107 may select a database 104 from a plurality of databases 104 that are in communication with a specific back end 124. For example as shown, reverse proxy 107 may optionally select database A-1 104 or database A-2 104, both of which are in communication with back end A 124. For example, database A-1 104 and database A-2 104 may optionally represent mirror or "back-up" databases, containing the same or substantially the same information. Back end A 124 may optionally select a particular database A 124 according to one or more parameters, including but not limited to location of the specific accessing application 102, query type (for example optionally view information and update information may be implemented through different databases) and so forth. Optionally, database A-1 104 and database A-2 104 may have the same or different IP addresses; if they share an IP address, then each database A 104 would communicate with back end A 124 through a different port.

Reverse proxy 107, accessing application 102 and database 104 preferably communicate through some type of computer network, although optionally different networks may communicate between accessing application 102 and reverse proxy 107 (as shown, a computer network 116), and between reverse proxy 107 and database 104 (as shown, a computer network 118). For example, computer network 116 may optionally be the Internet, while computer network 118 may optionally comprise a local area network, although of course both networks 116 and 118 could be identical and/or could be implemented according to any type of computer network.

In this embodiment of the system 100 according to the present invention, reverse proxy 107 preferably is addressable through both computer networks 116 and 118; for example, reverse proxy 107 could optionally feature an IP address for being addressable through either computer network 116 and/or 118.

Database 104 may optionally be implemented according to any type of database system or protocol; however, according to preferred embodiments of the present invention, database 104 is implemented as a relational database with a relational database management system. Non-limiting examples of different types of databases include SQL based databases, including but not limited to MySQL, Microsoft SQL, Oracle SQL, PostgreSQL, and so forth.

Optionally and preferably, system 100 may comprise a plurality of different databases 104 operating according to different database protocols and/or query languages and/or even having different structures. However, system 100 is also useful for a single database 104 (or multiple databases 104 of a single type, having a common database protocol, structure and/or query language), in that system 100 permits complete flexibility with regard to accessing application 102 and database 104; these two components do not need to be able to communicate with each other directly. As previously described, this lack of a requirement for direct communication may optionally be useful, for example, for legacy systems, or indeed for any system in which it is desirable to remove this requirement. Furthermore, this lack of a requirement may optionally be useful for organizations which have knowledge and skills with regard to particular types of database protocols, languages and/or software, but which may lack knowledge with regard to one or more other types.

These embodiments with regard to different database types and non-limiting examples of advantages may also optionally be applied to any of the embodiments of the system according to the present invention as described herein.

FIG. 1C shows a similar system to FIG. 1B, except that a single front end 120 and front end parser 122, and a single back end 124 and back end parser 126, are provided. As shown, all accessing applications 102 transmit queries to security apparatus 109 of reverse proxy 107, followed by translation by translating apparatus 108, and receive results from translating apparatus 108 through security apparatus 109 and hence through single front end 120 and front end parser 122. Furthermore, all databases 104 communicate with translating apparatus 108 through a single back end 124 and back end parser 126. Each of front end 120 and back end 124 preferably analyzes communications received from accessing application 102 or database 104, respectively, to determine the proper format for translation. Again policy module 142 is used to determine the format to which the query/results should be translated, according to the recipient database 104/accessing application 102, respectively.

Figure 1D:
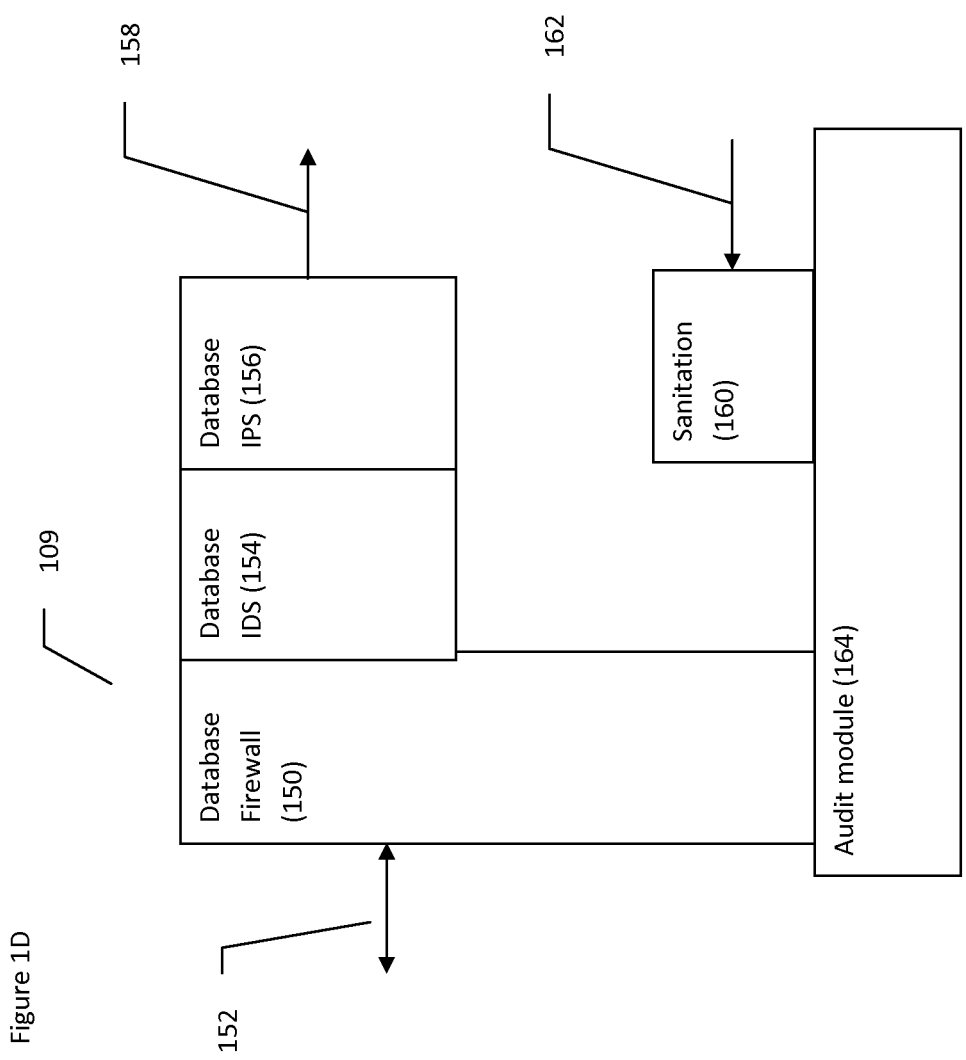
FIG. 1D shows an exemplary, illustrative non-limiting detailed embodiment of the security apparatus of FIGS. 1A-1C.

FIG. 1D shows security apparatus 109 according to at least some embodiments of the present invention in more detail. As shown, security apparatus 109 features a database firewall 150, which preferably handles all communications into security apparatus 109 (and hence into reverse proxy 107) from an external source represented by a double-headed arrow 152, such as the accessing application 102 of FIGS. 1A-1C (not shown), and also all communications from security apparatus 109 (and hence from reverse proxy 107) to the external source represented by arrow 152. Firewall 150 may optionally block one or more communications in either direction, for example according to one or more policies stored in policy module 142 (not shown, see FIGS. 1A-C) and/or according to instructions from a database IDS (intrusion detection system) 154 and/or a database IPS (intrusion prevention system) 156.

Database IDS 154 detects potential security breaches in terms of incoming queries, instructions or even data from an external source represented by arrow 152. Database IDS 154 preferably operates according to one or more policies stored in policy module 142 (not shown) with regard to whether one or more incoming queries, instructions or data is permitted to pass or should be rejected. Non-limiting examples of such policies include those which provide rules according to one or more specific query parameters and/or categories of such parameters, rules addressing specific users and/or categories of users (for example, according to permissions accorded to such users), IP address of the external source, type of application at the external source, specific database being queried and so forth. Optionally, a policy may feature automatic grouping—by users, source IP addresses and so forth—to allow a human administrator to review the policy and to adjust the policy manually.

Database IDS 154 optionally has a learning mode process, in which one or more initial rules are provided through one or more policies. Next, database IDS 154 applies the rules and determines whether one or more additional rules are required. For example, database IDS 154 may optionally request clarification from a human administrator as to whether a certain action is permitted and according to such clarification, determine one or more additional rules. The human administrator may also optionally manually add such one or more additional rules, whether separately from any particular event or in action to an event (including retroactively).

If the incoming one or more incoming queries, instructions or data passes database IDS 154, then optionally database IPS 156 determines whether to permit access to one or more databases (not shown). Database IPS 156 optionally provides a more binary response to such incoming queries, instructions or data, as they are either permitted or rejected. Database IDS 154 may optionally instruct database IPS 156 as to whether they should be rejected; however, preferably database IPS 156 determines acceptance separately according to one or more "fail safe" rules, which must be followed for the incoming queries, instructions or data to be accepted. Such fail safe rules may optionally be determined according to known, analyzed types of attacks, known malware and so forth; therefore, they may optionally be updated as new information is received. During the initial learning phase for database IDS 154, optionally only database IPS 156 is operative to provide at least a basic level of security.

After the response is received from the database (represented by an arrow 162; optionally the response is translated first (not shown)) by security apparatus 109 (and hence by reverse proxy 107), then a sanitation module 160 reviews the proposed response to determine whether it may be sent outside of reverse proxy 107. For example, a query may contain information that is not desirable for transmission beyond reverse proxy 107, for example to the external source represented by arrow 152. Such information may include for example internal information—database system time and version, database name, database subversion, error messages and so forth. Such internal information does not need to be sent with the response to the query, and in fact may be dangerous from a security perspective (as it may for example enable an attacker to learn about one or more vulnerabilities), so such sensitive information is preferably removed from the response, for example by changing one or more fields to null. This removal prevents sending sensitive information such as credit card number, ID number, telephone number etc, as well as internal system information which needs to be removed.

Sanitation module 160 operates according to one or more policies in policy module 142 (not shown), preferably including determinations of whether specific information or types of information may be sent according to the IP address of the external source and/or the user of the external source (for example with regard to an IP address and/or user within the organization as opposed to one operating remotely and/or through a web or HTTP based application). Optionally, error messages from the database are only released to certain users and/or are only released within the organization.

Again, database firewall 150 may determine whether the response is released from reverse proxy 107, for example according to one or more specific policies.

Optionally, an audit module 164 logs all incoming queries and outgoing responses, along with any reactions from any of the above components.

Figure 2A:
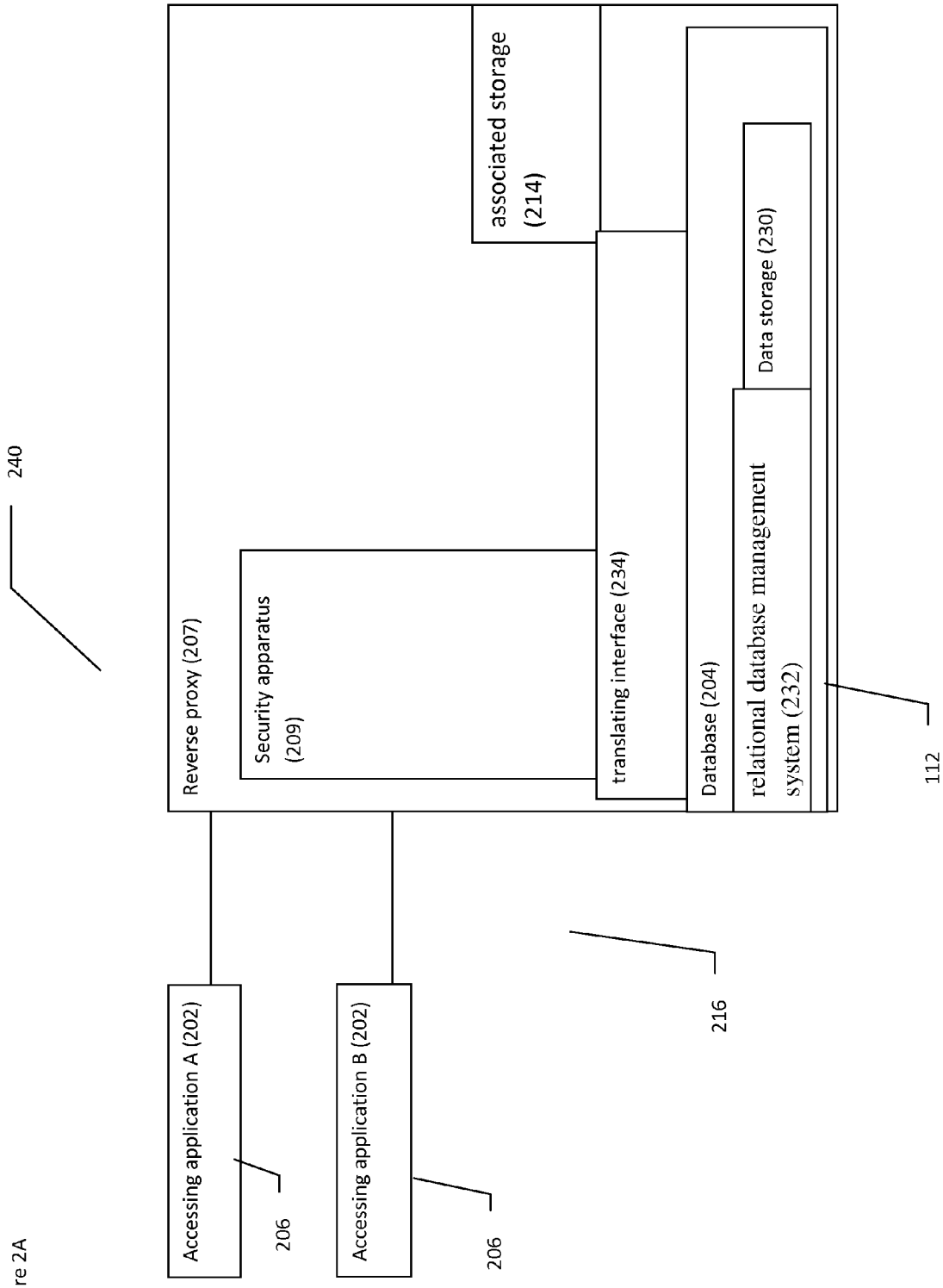
FIGS. 2A-2C show alternative, illustrative exemplary systems according to at least some embodiments of the present invention, in which the reverse proxy is incorporated within the database.
Figure 2B:
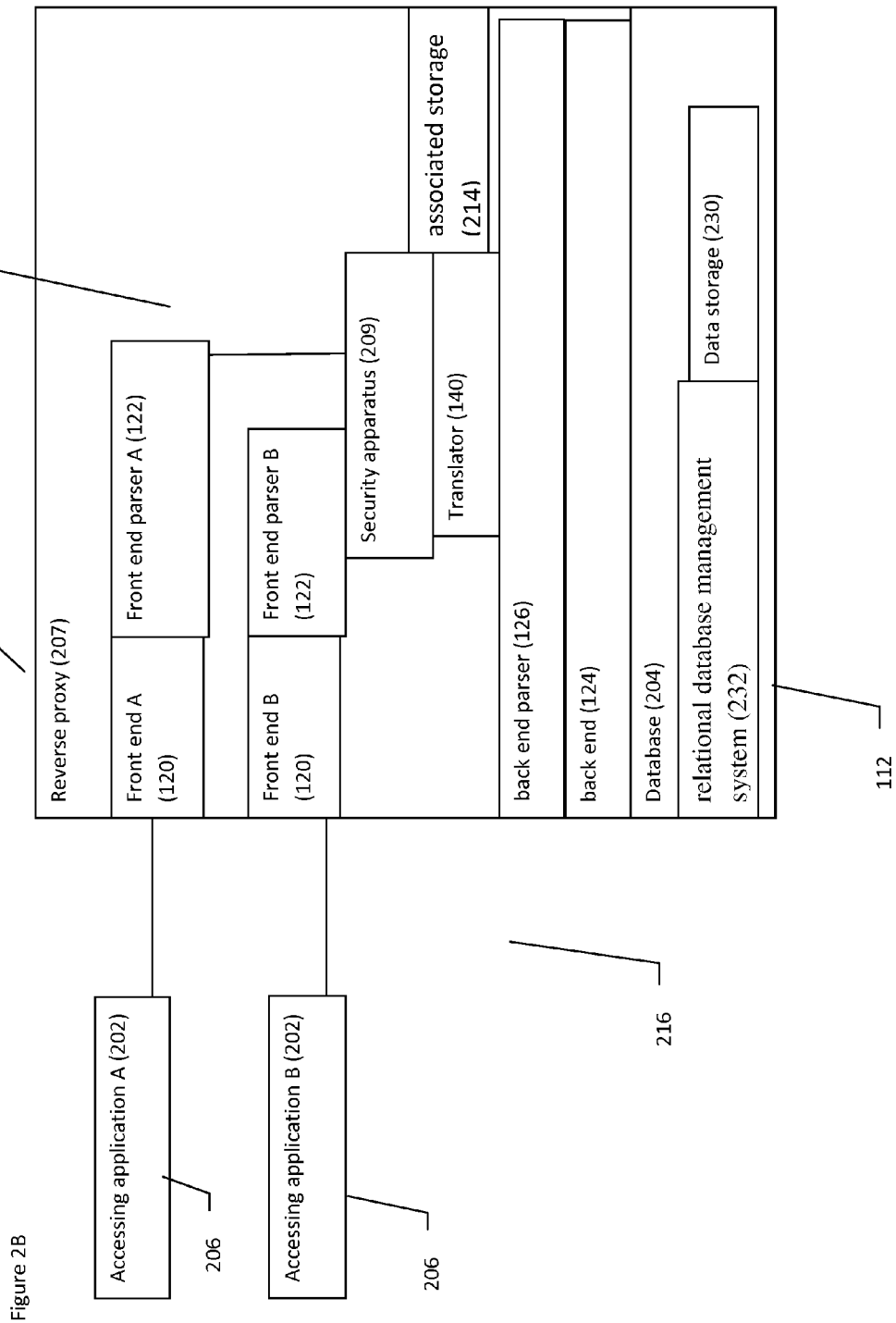
Figure 2C:
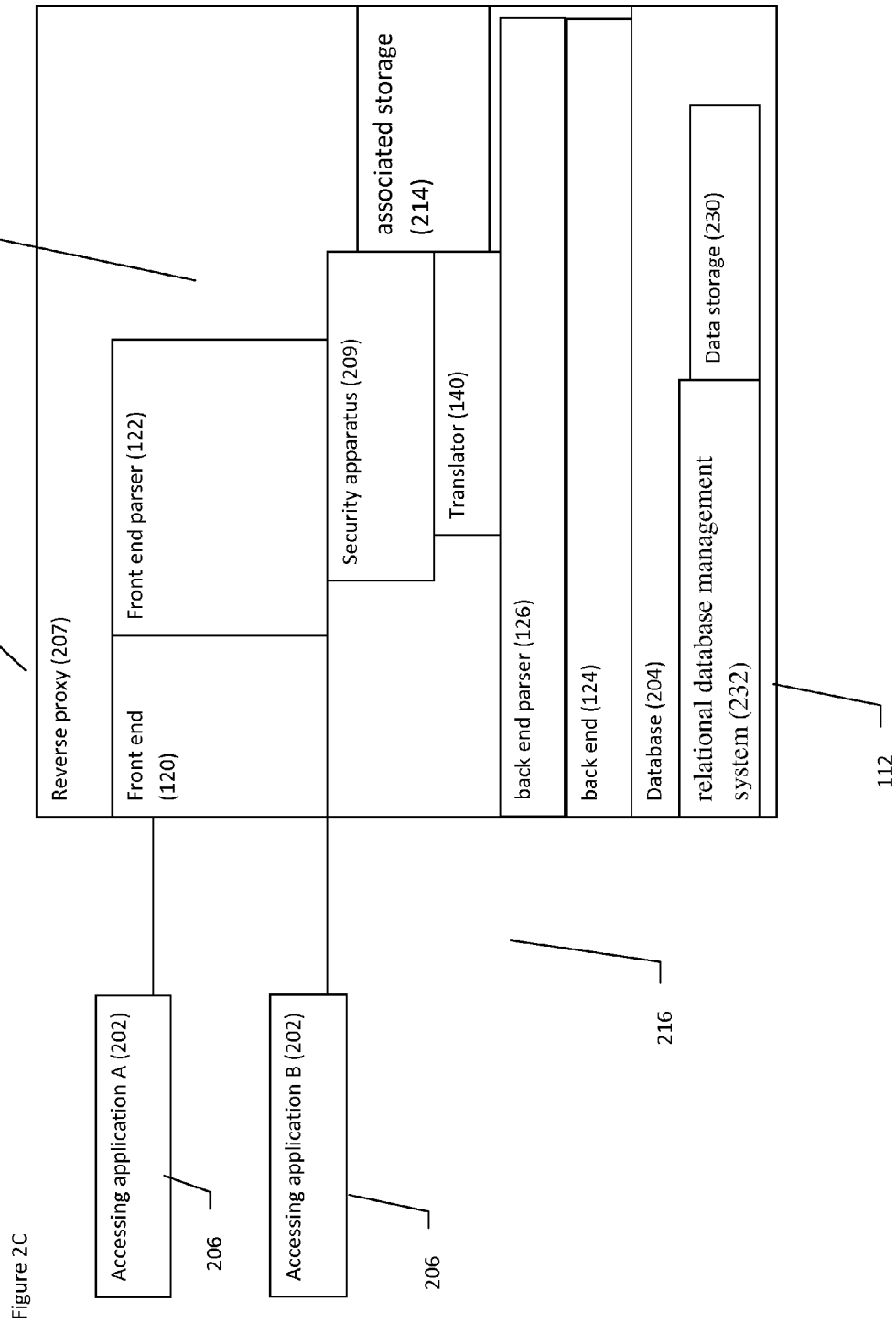

FIG. 2A-C show alternative, illustrative exemplary systems according to at least some embodiments of the present invention, in which the reverse proxy is incorporated within the database, such that the reverse proxy is operated by the same hardware as the database; the hardware may optionally be a single hardware entity or a plurality of such entities. For this exemplary system, the database is shown as a relational database with a relational database management system for the purpose of illustration only and without any intention of being limiting. Components with the same or similar function are shown with the same reference number plus 100 as for FIGS. 1A-C.

The operation of security apparatus 209 is similar for FIGS. 2A-C, except that for those embodiments, reverse proxy 207 (and hence security apparatus 209) is operated by the same hardware that operates the database, as described in greater detail below.

As shown with regard to FIG. 2A, system 200 again features a plurality of accessing applications 202, of which two are shown, accessing applications 202 A and B, but in this case these accessing applications 202 are addressing a single database 204. Database 204 is preferably implemented as a relational database, with a data storage 230 having a relational structure and a relational database management system 232. Accessing application 202 addresses database 204 according to a particular port; however, as database 204 is operated by a server 240 as shown, accessing application 202 sends the query to the network address of server 240.

Unlike for the system of FIG. 1A, reverse proxy 207, security apparatus 209 and a translating interface 234 are all preferably running over the same hardware as database 204, optionally by single server 240 as shown or alternatively through distributed computing, rather than being implemented as a separate apparatus.

As shown in FIGS. 2B and 2C, front end 120 A or B again receives queries from accessing applications 202 A or B, respectively, each of which is preferably addressable as previously described through a particular port or address. Translator 140 again translates the queries and the respective results, as previously described. The operation is preferably substantially similar to that of the translating apparatus of FIG. 1B.

Reverse proxy 207 and accessing application 202 preferably communicate through a computer network 218, which may optionally be implemented according to any type of computer network as described above. Also as noted above, accessing application 202 sends the query for database 204 to the network address of server 240. The query is sent to a particular port; this port may optionally be the regular or "normal" port for database 204, in which case translating interface 234 communicates with database 204 through a different port. Otherwise, accessing application 202 may optionally send the query to a different port for reverse proxy 207, so that reverse proxy 207 communicates with database 204 through a different port.

Preferably, reverse proxy 207 receives queries through a particular port for each database type. By "database type" it is meant a particular combination of database structure, protocol and query language; databases of the same database type can communicate freely without translation. For example, one database type could optionally be a relational database operated by MySQL, while another database type could optionally be a relational database operated by MS (Microsoft) SQL. Queries for each such type are preferably received through a different port, which accessing application 202 is more preferably configured to access. Optionally there could be a generic port for any non pre-configured database types.

FIG. 2C shows a similar system as to FIG. 2B, except that there is a single front end 120 and a single front end parser 122, which analyzes the received queries to determine how they should be translated by translator 140, and which also prepares the results for transmission back to the requesting accessing application 202.

FIG. 3 is a flowchart of an exemplary, illustrative method for operation of a reverse proxy according to at least some embodiments of the present invention, with interactions between the accessing application, reverse proxy, and the database. Arrows show the direction of interactions. As shown, in stage 1, a query is transmitted from some type of query generating application, shown as the accessing application as a non-limiting example only, and is sent to the reverse proxy, preferably to a particular front end being addressed through a particular port or address, according to the specific query generating application. As described above, the query generating application may optionally be any type of application, such as for example the accessing application of FIG. 1 or 2.

In stage 2, the front end preferably passes the query to the translation mechanism for translation, preferably with information regarding the query and the identity of the query generating application. In stage 3, the translated query is reviewed by the security apparatus, to determine whether it is to be accepted or rejected. Optionally, the translation and security review process occurs in two parts as shown, with a first translation/review occurring at stages 2 and 3; if the initial translation shows that the query is acceptable, then the security apparatus informs the translation mechanism that a full translation may occur in stage 4, after which the full translation is passed from the translation mechanism to the security apparatus in stage 5.

In stage 6, the translated query is provided to the back end and back end parser, for preparation for transmission to the specific database to which query is to be addressed. In stage 7, the translated query is sent to the back end database that is being used to store the data. In stage 8, the retrieved data is returned to the security apparatus. In stage 9, the security apparatus reviews the retrieved data and optionally removes part or all of the data, such as sensitive information, as previously described.

In stage 10, any permitted data is passed to the translating apparatus or interface, if necessary, translates the received data. In stage 11, the front end parser converts the retrieved, translated data to a format which is useable by the accessing application. In stage 12, the retrieved data is returned to the query generating application by the front end.

The below relates to a non-limiting example of translation of a query from MySQL to PostgreSQL, and then the response is translated back from PostgreSQL to MySQL.

Translation between MySQL to PostgreSQL:

An SQL command is received from an application which sends this query command to a MySQL Database:

CREATE TABLE table2(table2_id bigint PRIMARY KEY
    auto_increment,descr char(50),table1_id bigint NOT NULL
    REFERENCES table1(table1_id) ON UPDATE CASCADE
    ON DELETE CASCADE);

The query is parsed and analyzed by the translation mechanism, according to the policy, and this command is sent to the back end PostgreSQL Database:

CREATE TABLE table2(table2_id SERIAL PRIMARY KEY,descr char(50),table1_id bigint NOT NULL
    REFERENCES table1(table1_id) ON UPDATE CASCADE
    ON DELETE CASCADE);

The PostgreSQL replies to the translation apparatus with the below response:

NOTICE: CREATE TABLE will create implicit sequence "table2_table2_id_seq" for serial column "table2.table2_id"
    NOTICE: CREATE TABLE/PRIMARY KEY will create implicit index "table2_pkey" for table "table2"
    CREATE TABLE The translation apparatus replies with these commands in a MySQL format: Query OK, 0 rows affected (0.03 sec)

The below is a non-limiting, illustrative example of advanced translation between PostgreSQL to MySQL.

An SQL command is received from an application which sends this query command to a PostgreSQL Database:

DECLARE curs1 SCROLL CURSOR WITH HOLD
    FOR SELECT table2.table2_id as ID,table1.table1_id as TypeID, table1.name as TypeName,table2.descr as Description FROM table1,table2 where table1.table1_id=table2.table1id;
    FETCH FORWARD 5 from curs1;
    The query is parsed and analyzed by the translation mechanism, according to the policy, and this command is sent to the back end in MySQL:
    DELIMITER $$
CREATE PROCEDURE curdemo( ) BEGIN DECLARE done BOOLEAN DEFAULT 0; DECLARE i INT DEFAULT 0;DECLARE ID varchar(255); DECLARE TypeID varchar(255); DECLARE TypeName varchar(255); DECLARE Descr varchar(255); DECLARE curs1 CURSOR FOR SELECT table2.table2_id as ID,table1.table1id as TypeID,table1.name as TypeName,table2.descr as Description FROM table1,table2 where table1.table1_id=table2.table1_id; DECLARE CONTINUE HANDLER FOR SQLSTATE '02000' SET done=1; OPEN curs1; REPEAT FETCH curs1 into ID,TypeID,TypeName,Descr; select ID,TypeID,TypeName,Descr; SET i=i+1; UNTIL done or i=5 END REPEAT; close curs1; END$$
DELIMITER;
call curdemo;
DROP PROCEDURE curdemo( );
The MySQL database replies to the translation apparatus:
    Query OK, 0 rows affected (0.00 sec)

In this example, the "fetch backward" command doesn't exist in MySQL, so the translation apparatus places the data into temp variables or temp table and then echoes it to screen. The translation apparatus then replies with these commands in a PostgreSQL format, as shown by the below table:

| id | typeid | typename | description |
|----|--------|----------|-------------|
| 1  | 1      | name1    | descr1      |
| 2  | 1      | name1    | descr2      |
| 3  | 1      | name1    | descr3      |
| 4  | 2      | name2    | descr1      |
| 5  | 2      | name2    | descr2      |

Figure 4:
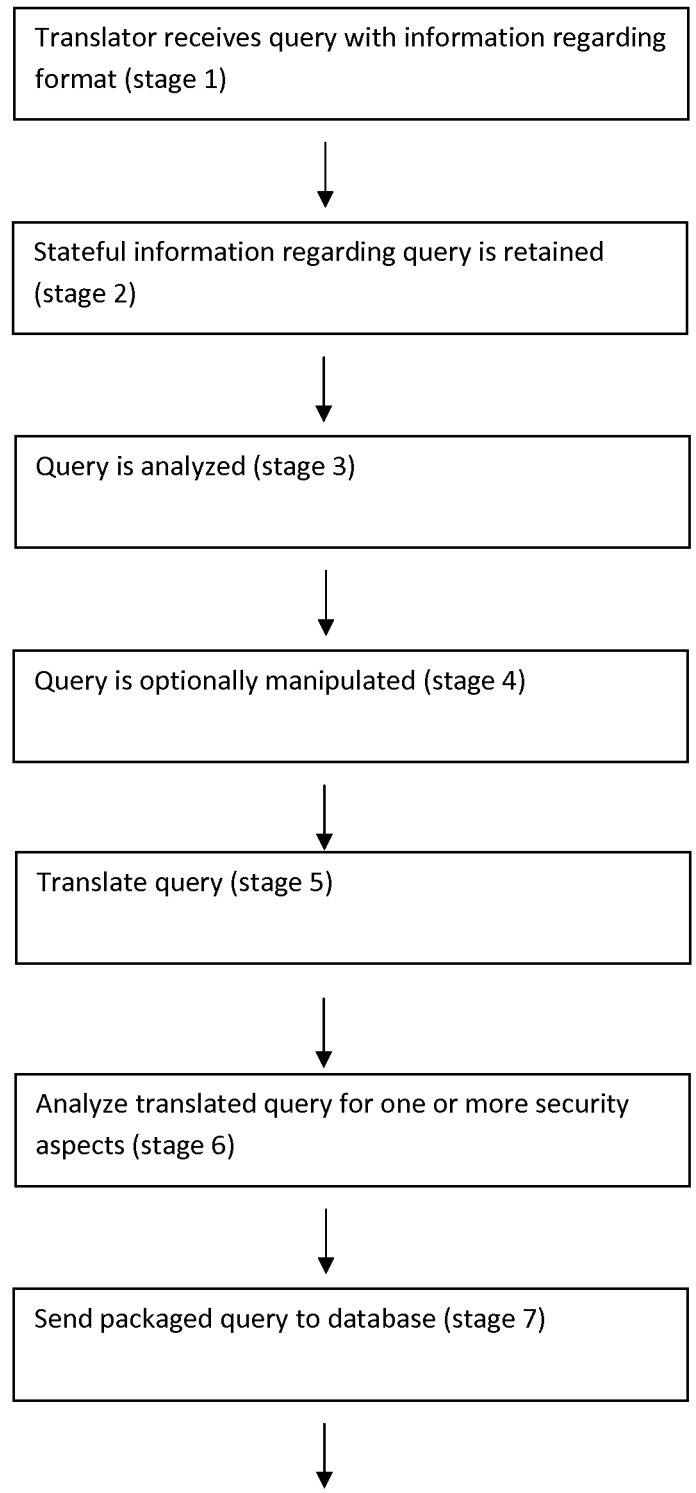
FIG. 4 is a flowchart of an exemplary, illustrative method for translations of database queries/results with security review according to at least some embodiments of the present invention.

FIG. 4 is a flowchart of an exemplary, illustrative method for translations of database queries/results according to at least some embodiments of the present invention, after review for security aspects by the reverse proxy. It is assumed that before the initiation of the method as shown, the reverse proxy has either analyzed the query and has determined that it can be passed to the translator, or alternatively, that the translator is required to translate the query before the reverse proxy can analyze it with regard to security aspects.

As shown, in stage 1, the translator (whether an apparatus or interface) receives a database query, preferably with information regarding the query, optionally and more preferably including one or more of the identity of the querying application, the type of the requesting application, the database protocol and/or language and/or software, and also the identity of the front end which is to receive the translated database results.

In stage 2, stateful information regarding the query is preferably retained, in order to enable the results to be provided to the correct querying application, for example as described above with regard to the information received with the query.

In stage 3, the query is preferably analyzed, to determine whether one or more parts of the query may or may not be translated. Also preferably the analysis determines whether the query is read only, or includes writing and/or updating.

In stage 4, optionally one or more parts of the query are manipulated, if they cannot be translated directly, preferably as determined according to the above analysis stage. As a non-limiting example, if the query features binary data that cannot be translated, then this stage prepares the binary data so that it can be sent directly to the database, preferably with a message indicating the nature of the binary data and how to read it (for example, the type of application that is able to read the binary data). As another non-limiting example, if the query is "chained" or features a plurality of linked queries, the query is preferably decomposed to these smaller queries.

In stage 5, one or more parts of the query are translated. In stage 6, the query is analyzed for one or more security aspects by the reverse proxy, if it was not able to do so (partially or fully) before translation. Also the translated query is packaged for being sent to the database, for example by preparing the query according to the required format for the database and/or by providing any necessary auxiliary information. In stage 7, the packaged query is sent to the database.

In stage 8, the results are received as an answer from the database. The answer is then translated in stage 9, optionally with one or more parts of the results not being translated for the reasons described herein. In stage 10, the translated results are optionally again analyzed according to one or more security aspects by the reverse proxy; alternatively, such analysis may optionally be performed after stage 8 but before stage 9. In stage 11, the packaged results are sent to the querying application.

The above described translating apparatus (or interface) is preferably able to operate with multiple different types of databases. Non-limiting examples of different types of databases include 3D databases, flat file databases, hierarchical databases, object databases or relational databases, including the various types described above. The translating apparatus (or interface) is preferably also adjusted for different types of database languages for any given type of database as described herein.

Figure 5A:
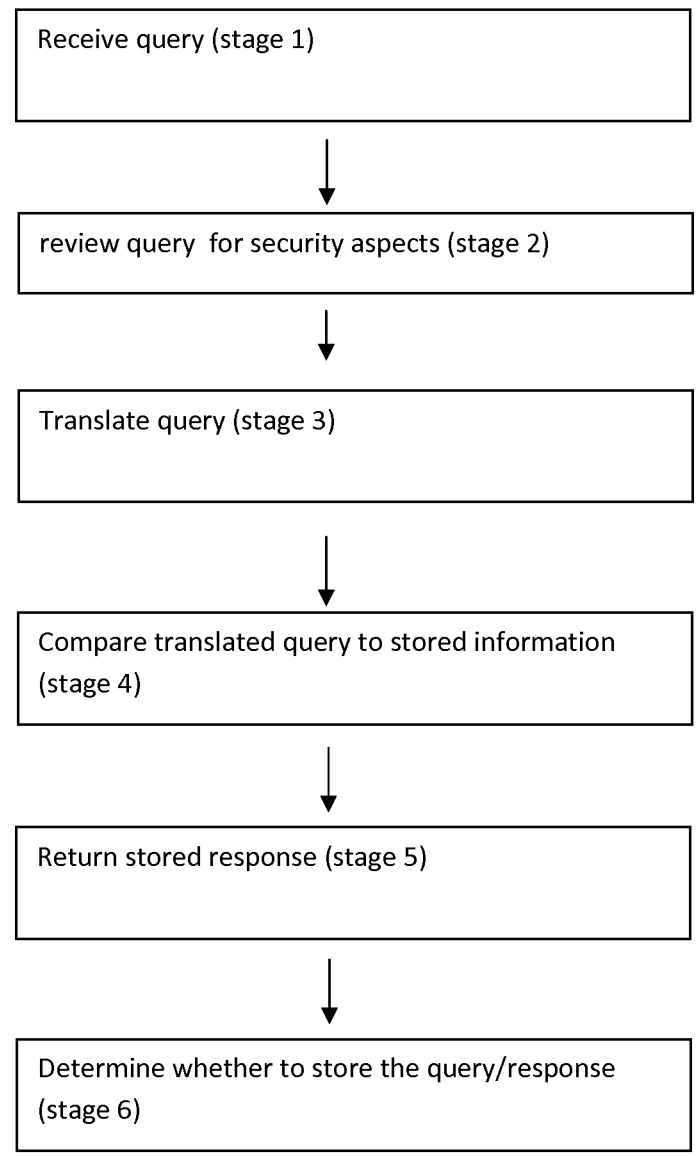
FIGS. 5A and 5B relate to two different exemplary embodiments of a combined security, smart caching and translation process according to the present invention.
Figure 5B:
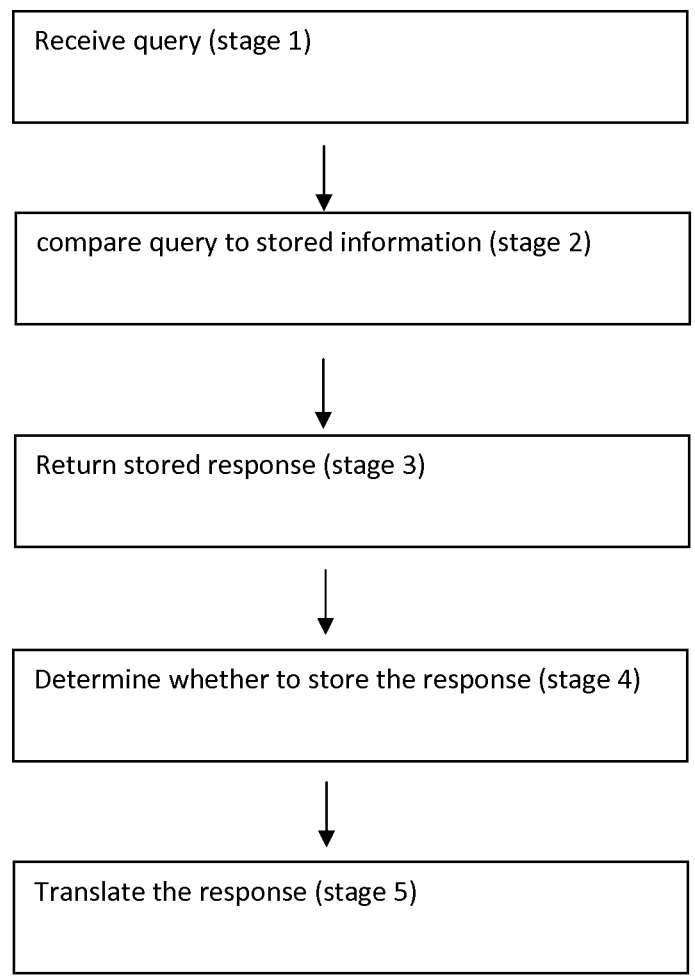

FIG. 5 relates two different exemplary embodiments of a combined smart caching and translation process according to the present invention. The smart caching process and system may optionally be implemented as described with regard to the concurrently filed U.S. Provisional Application entitled "Smart database caching", owned in common with the present application and having at least one inventor in common, which is hereby incorporated by reference as if fully set forth herein. FIG. 5A shows an exemplary, illustrative process for translation before smart caching, while FIG. 5B shows an exemplary, illustrative process for translation after smart caching.

Turning now to FIG. 5A, as shown, in stage 1, a query is received, indicating both the original query language and format, and also the query language/format for the intended receiving database. In stage 2, the query is reviewed for security aspects as previously described.

In stage 3, the query is translated into the query language/format for the intended receiving database as described herein according to any of the embodiments of the present invention.

In stage 4, the translated query is compared to stored query/response pairs by the smart caching apparatus (or interface). In stage 5, if the translated query is found to have a stored response, then that response is returned back to the querying application (optionally with translation if necessary, although of course the response could be stored in the desired form for the querying application). Optionally in some situations, only stored information may be retrieved, for example to provide greater security.

Otherwise in stage 6, the process described in the concurrently filed U.S. Provisional Application is performed for determining whether to store the query/response pair. Optionally any such process may be performed, but preferably a process is performed which enables the query/response pair to be stored according to one or more rules, including but not limited to popularity, security, type of information provided, type of database and so forth. Also optionally, a security review is performed before storage (for example to avoid storing sensitive information as previously described).

FIG. 5B shows an exemplary, illustrative process for translation after smart caching. As shown, in stage 1, as for FIG. 5A, a query is received, indicating both the original query language and format, and also the query language/format for the intended receiving database.

In stage 2, the non-translated query (ie the query as received) is compared to stored query/response pairs by the smart caching apparatus (or interface). In stage 3, if the query is found to have a stored response, then that response is returned back to the querying application (optionally with translation if necessary). Otherwise in stage 4, the process described in the concurrently filed U.S. Provisional Application is performed for determining whether to store the query/response pair. Optionally any such process may be performed, but preferably a process is performed which enables the query/response pair to be stored according to one or more rules, including but not limited to popularity, security, type of information provided, type of database and so forth.

In stage 5, at least the response is translated, for example to the language of the querying application, before being returned to the querying application. However, preferably the query and the response are not translated before being stored.

Figure 6:
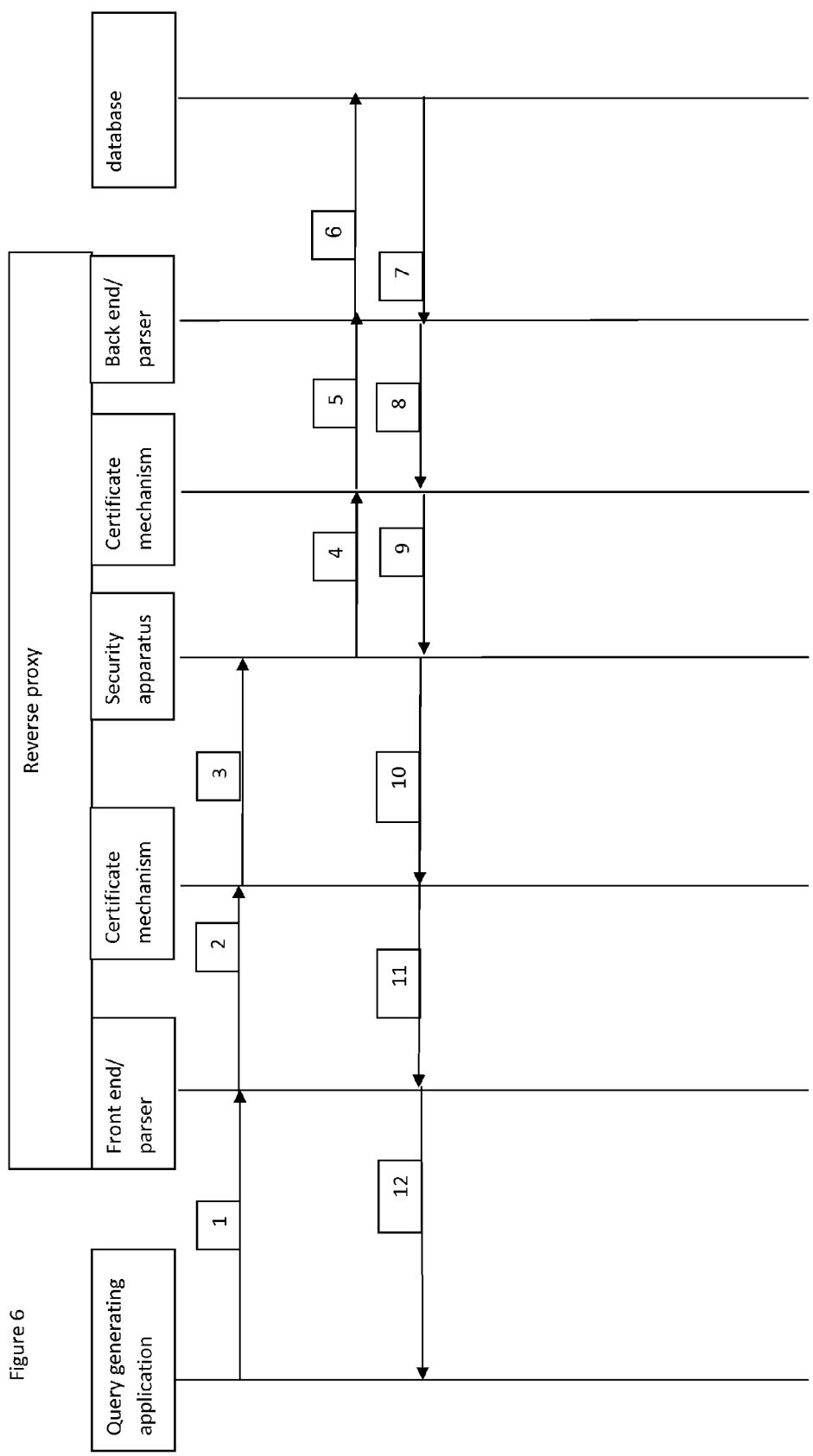
FIG. 6 relates to an exemplary, illustrative embodiment of the present invention for providing a secure channel for communication between the accessing application(s), the reverse proxy and the database(s).

FIG. 6 relates to an exemplary, illustrative embodiment of the present invention for providing a secure channel for communication between the accessing application(s), the reverse proxy and the database(s). For both embodiments, it is assumed that the secure channel is implemented through SSL, by using a certificate, for the purposes of illustration only and without any intention of being limiting in any way.

FIG. 6 shows interactions between the accessing application, a certificate mechanism, the reverse proxy, and the database. Arrows show the direction of interactions. As shown, in stage 1, a query is transmitted from some type of query generating application, shown as the accessing application as a non-limiting example only, and is sent to the reverse proxy, preferably to a particular front end being addressed through a particular port or address, according to the specific query generating application. As described above, the query generating application may optionally be any type of application, such as for example the accessing application of FIG. 1 or 2. Although the translator is not explicitly shown it may optionally be incorporated to the process as previously described.

In stage 2, the front end preferably passes the query to a certificate mechanism for processing the query according to the requirements of the secure channel, so that the information of the query is available for further analysis. In stage 3, the query is reviewed by the security apparatus, to determine whether it is to be accepted or rejected. In stage 4, if acceptable, the query is again preferably processed by the certificate mechanism to maintain security.

In stage 5, the secured query is provided to the back end for transmission to the specific database to which query is to be addressed. In stage 6, the secured query is sent to the back end database that is being used to store the data. In stage 7, the retrieved data is returned to the back end and hence, in stage 8 to the certificate mechanism for accessing the response data. In stage 9, the security apparatus reviews the retrieved data and optionally removes part or all of the data, such as sensitive information, as previously described.

In stage 10, any permitted data is passed to the certificate mechanism. In stage 11, the front end parser converts the secured data to a format which is useable by the accessing application. In stage 12, the secured data is returned to the query generating application by the front end.

The above method may optionally be performed such that a different certificate is used for communications between the requesting application and the reverse proxy, and the reverse proxy and the database. Alternatively, the same certificate may optionally be used for all communications.

While the invention has been described with respect to a limited number of embodiments, it will be appreciated that many variations, modifications and other applications of the invention may be made.

What is claimed is:

1. A method for providing security for a plurality of databases, the method comprising:
   providing a plurality of servers;
   providing said plurality of databases running on a first portion of said plurality of servers;
   providing a plurality of database accessing applications running on a second portion of said plurality of servers;
   providing a first network and a second network;
   providing a reverse database proxy running on a third portion of said plurality of servers for handling database queries between said plurality of accessing applications and said plurality of database; wherein said plurality of accessing applications communicates with said reverse database proxy over said first network and wherein said reverse database proxy communicates with said plurality of databases over said second network; wherein said reverse database proxy comprises a front end parser and a back end parser;

providing a first secure channel over said first network, wherein said first secure channel comprises a first certificate, and wherein said reverse database proxy issues said first certificate to one of said plurality of accessing applications, such that communication between said reverse database proxy and said one of said plurality of accessing applications is secured by a first certificate;

providing a second secure channel over said second network, wherein said second secure channel comprises a second certificate, and wherein said reverse database proxy issues said second certificate to a receiving database, such that communication between said reverse database proxy and said receiving database is secured by a second certificate;

sending a database query from said one of said plurality of accessing applications to said reverse database proxy over said first secure channel;

parsing by said front end parser of said database query from said one of said plurality of accessing applications into a general format understandable by said reverse database proxy;

analyzing said database query by said reverse database proxy to determine whether said database query is acceptable according to at least one security policy and to determine an address of said receiving database from one of said plurality of databases for receiving said database query;

when said database query is acceptable, passing said database query to said back end parser for parsing into a format according to the requirements of said receiving database;

passing said database query to said address of said receiving database over said second secure channel by said reverse database proxy;

receiving a database response by said reverse database proxy from said receiving database over said second secure channel;

parsing said response from said receiving database by said back end parser into a general format understandable by said reverse database proxy;

analyzing said response by said reverse database proxy to determine whether said database response is acceptable according to at least one security policy;

when said database response is acceptable, then passing said database response to said front end parser for parsing into a format according to the requirements of said one of said plurality of accessing applications; and transferring said database response to said one of said plurality of accessing application over said first secure channel by said reverse database proxy;

wherein said analyzing said database response by said reverse database proxy comprises determining whether sensitive information is included in said database response; and when included, removing said sensitive information before said database response is transferred to said accessing application.

2. The method of claim 1, wherein said analyzing said database query by said reverse database proxy to determine whether said database query is acceptable further comprises determining whether said database query requires translation and, when required translating said database query before transmission to said database.

3. The method of claim 2, wherein said analyzing said database response by said reverse database proxy comprises determining whether said database response requires translation and, when required translating said database response before transmitting to said one of said plurality of accessing applications.

4. The method of claim 1 wherein said first certificate and second certificate are the same certificate.

5. The method of claim 1 wherein said first network and said second network are the same network.

6. The method of claim 1 wherein said second portion and said third portion of said plurality of servers are the same portion, such that said reverse database proxy and said plurality of databases run on the same servers.

7. The method of claim 1 wherein said second portion and said third portion of said plurality of servers run on the same hardware.

8. A method for providing security for a plurality of databases, the method comprising:

providing a plurality of servers;

providing said plurality of databases running on a first portion of said plurality of servers;

providing a plurality of database accessing applications running on a second portion of said plurality of servers;

providing a network;

providing a reverse database proxy running on a third portion of said plurality of servers for handling database queries between the accessing applications and the databases over said network;

providing a secure channel over said network between each of said accessing applications and said reverse database proxy and between said reverse database proxy and each of said databases; wherein said secure channel comprises at least one certificate issued for communication between each of said accessing applications and each of said databases; said certificate transferred from said accessing application to said database through said reverse proxy;

sending a database query from said accessing application to said reverse database proxy over said secured channel;

analyzing said database query by said reverse database proxy to determine whether said database query is acceptable according to at least one policy and to determine an address of a database for receiving said database query;

when said database query is acceptable, passing said database query to said address of said database over said secured channel by said reverse database proxy;

receiving a database response by said reverse database proxy from said database;

analyzing said database response by said reverse database proxy to determine whether said database response is acceptable according to at least one policy; and when said database response is acceptable, then transferring said database response to said accessing application over said secure channel by said reverse database proxy;

wherein said analyzing said database query by said reverse database proxy to determine whether said database query is acceptable further comprises determining whether said database query requires translation and, when required, translating said database query before transmission to said database, and wherein said analyzing said database response by said reverse database proxy comprises determining whether said database response requires translation and, when required, translating said database response before transmitting to said accessing application.

9. The method of claim 8, wherein at least a portion of said database query or said database response is not translated.

10. The method of claim 8, wherein said database is one of: a 3D database, a flat file database, an hierarchical database, an object database or a relational database.

11. The method of claim 10, wherein said relational database is operated by one of: MySQL, Microsoft SQL, Oracle SQL, or PostgreSQL.

12. A method for providing security for a plurality of databases, the method comprising:
providing a plurality of servers;
providing said plurality of databases running on a first portion of said plurality of servers;
providing a plurality of database accessing applications running on a second portion of said plurality of servers;
providing a network;
providing a reverse database proxy running on a third portion of said plurality of servers for handling database queries between the accessing applications and the databases over said network, wherein said reverse database proxy further compromises a caching module;
providing a secure channel over said network between each of said accessing applications and said reverse database proxy and between said reverse database proxy and each of said databases; wherein said secure channel comprises at least one certificate issued for communication between each of said accessing applications and each of said databases;
said certificate transferred from said accessing application to said database through said reverse proxy;
sending a database query from said accessing application to said reverse database proxy over said secure channel;
analyzing said database query by said reverse database proxy to determine whether said database query is acceptable according to at least one policy and to determine an address of a database for receiving said database query;
when said database query is acceptable, passing said database query over said secure channel to said address of said database by said reverse database proxy;
receiving a database response by said reverse database proxy from said database;
analyzing said database response by said reverse database proxy to determine whether said database response is acceptable according to at least one policy;
when said database response is acceptable, then transferring said database response to said accessing application over said secure channel by said reverse database proxy; and
caching said database query and said database response in said caching module to form a database query database response pair.

13. The method of claim 12, wherein said caching module will transfer said database response of said database query database response pair to said accessing application when a subsequent database query matches said database query of said database query database response pair.

14. The method of claim 12, wherein said database query database response pair is stored in said caching module according to at least one of: popularity, security, type of information provided, or type of database.

15. A method for providing security for a plurality of databases, the method comprising:
providing a plurality of servers;
providing said plurality of databases running on a first portion of said plurality of servers;
providing a plurality of database accessing applications running on a second portion of said plurality of servers;
providing a network;
providing a reverse database proxy running on a third portion of said plurality of servers for handling database queries between the accessing applications and the databases over said network, wherein said reverse database proxy further compromises a plurality of front ends each identified by one of a port or IP address and wherein each of said plurality of front ends corresponds to one of said plurality of databases;
providing a secure channel over said network between each of said accessing applications and said reverse database proxy and between said reverse database proxy and each of said databases; wherein said secure channel comprises at least one certificate issued for communication between each of said accessing applications and each of said databases;
said certificate transferred from said accessing application to said database through said reverse proxy;
sending a database query from said accessing application to said reverse database proxy over said secure channel;
analyzing said database query by said reverse database proxy to determine whether said database query is acceptable according to at least one policy;
when said database query is acceptable, passing said database query to said one of said plurality of databases over said secure channel based on said one of port or IP address of said front end by said reverse database proxy through a secure channel comprising a certificate;
receiving a database response by said reverse database proxy from said one of said plurality of databases;
analyzing said database response by said reverse database proxy to determine whether said database response is acceptable according to at least one policy; and
when said database response is acceptable, then transferring said database response to said accessing application over said secure channel by said reverse database proxy.

16. A method for providing security for a plurality of databases, the method comprising:
providing a plurality of servers;
providing said plurality of databases running on a first portion of said plurality of servers;
providing a plurality of database accessing applications running on a second portion of said plurality of servers, wherein said database accessing applications are adapted for communication with a database;
providing a first network and a second network;
providing a reverse database proxy running on a third portion of said plurality of servers for handling database queries between said plurality of accessing applications and said plurality of database; wherein said plurality of accessing applications communicates with said reverse database proxy over said first network and wherein said reverse database proxy communicates with said plurality of databases over said second network;
providing a first secure channel over said first network, wherein said first secure channel comprises a first certificate, and wherein said reverse database proxy issues said first certificate to one of said plurality of accessing applications, such that communication between said reverse database proxy and said one of said plurality of accessing applications is secured by a first certificate;

providing a second secure channel over said second network, wherein said second secure channel comprises a second certificate, and wherein said reverse database proxy issues said second certificate to a receiving database, such that communication between said reverse database proxy and said receiving database is secured by a second certificate;

sending a database query from one of said plurality of accessing applications to said reverse database proxy over said first secure channel;

analyzing said database query by said reverse database proxy to determine whether said database query is acceptable according to at least one security policy and to determine an address of a receiving database from one of said plurality of databases for receiving said database query;

when said database query is acceptable, passing said database query to said address of said receiving database over said second secure channel by said reverse database proxy;

receiving a database response by said reverse database proxy from said receiving database over said second secure channel;

analyzing said database response by said reverse database proxy to determine whether said database response is acceptable according to at least one security policy; and when said database response is acceptable, then transferring said database response to said one of said plurality of accessing applications over said first secure channel by said reverse database proxy.

17. The method of claim 16 wherein said analyzing said database response by said reverse database proxy comprises determining whether sensitive information is included in said database response; and, when included, removing said sensitive information before said database response is transferred to said accessing application.

18. The method of claim 16 wherein said first certificate and second certificate are the same certificate.

19. The method of claim 16 wherein said first network and said second network are the same network.

20. The method of claim 16 wherein said second portion and said third portion of said plurality of servers are the same portion, such that said reverse database proxy and said plurality of databases run on the same servers.

21. The method of claim 16 wherein said second portion and said third portion of said plurality of servers run on the same hardware.

* * * * *